Nov. 8, 1938. C. J. RODMAN 2,135,877
METHOD OF MAKING TUBS
Original Filed April 27, 1934 2 Sheets—Sheet 1
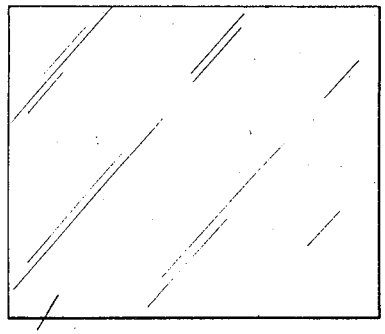
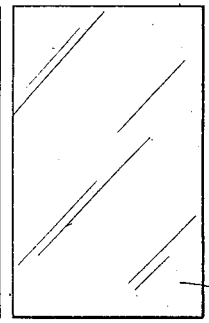
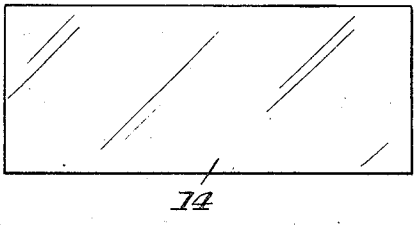
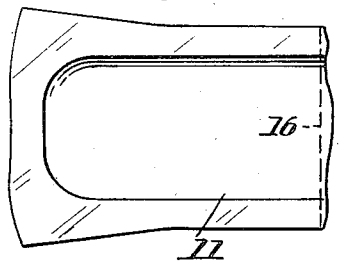
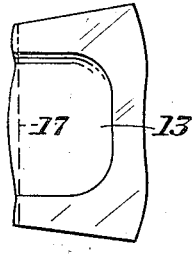
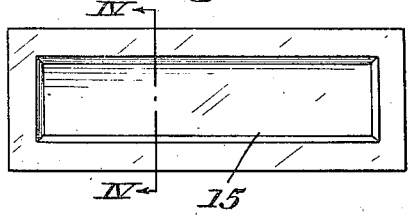
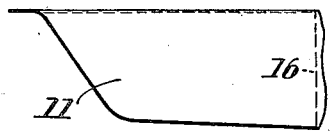
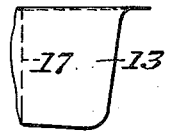
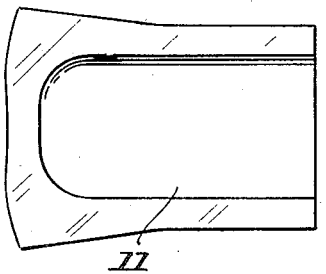
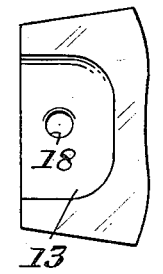
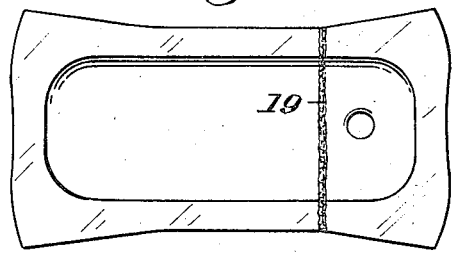
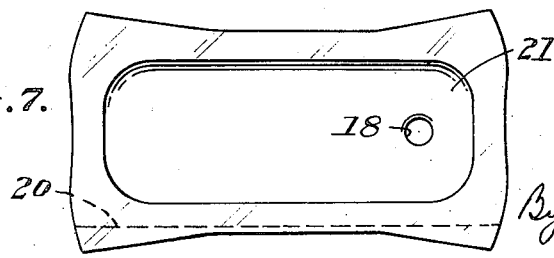
INVENTOR
Clarence J. Rodman
by his attorneys
Byrnes, Stebbins & Blenko

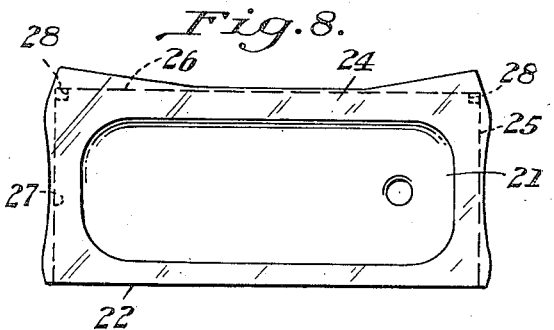
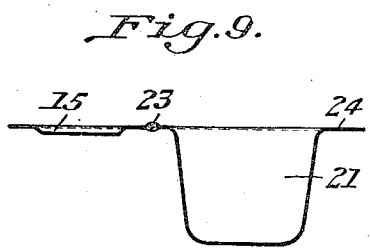
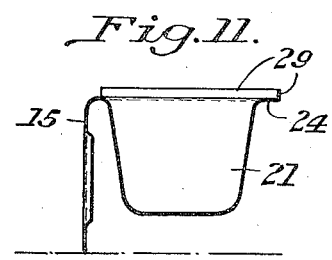
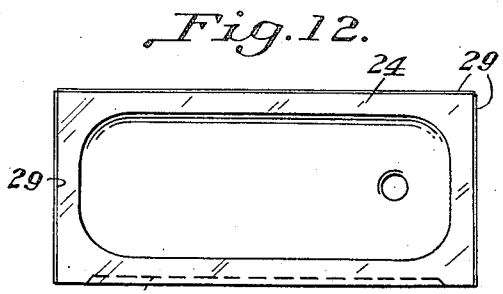
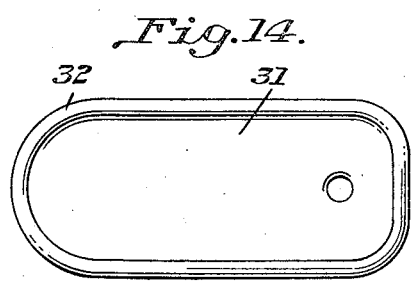
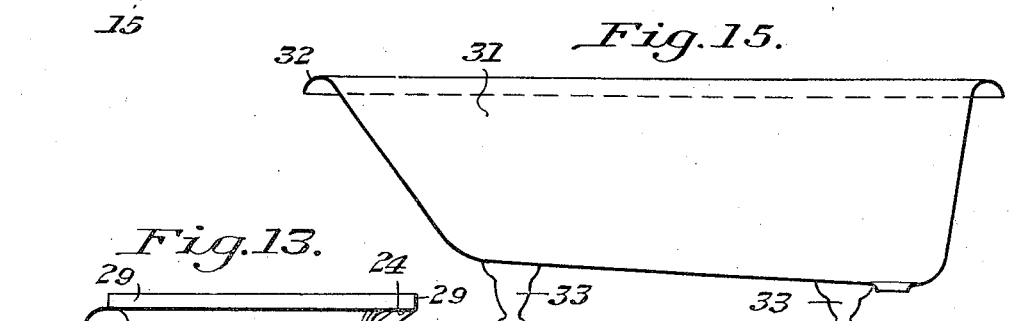
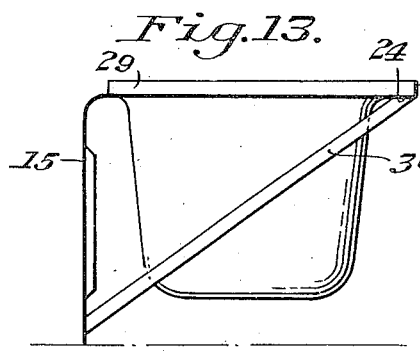

Patented Nov. 8, 1938

2,135,877

UNITED STATES PATENT OFFICE 2,135,877

METHOD OF MAKING TUBS

Clarence James Rodm n Alliance, Ohio, assignor to The Steel Sanitary Company, Alliance, Ohio, a corporation of Ohio Application April 27, 1934, Serial No. 722,626
Renewed April 6, 1937

3 Claims. (Cl. 113—120)

My invention relates to a method of making tubs and more specifically bath tubs. While the invention is disclosed herein as applicable specifically to bath tubs of the usual shape, it is also useful in the making of tubs or similar receptacles of other shapes.

Numerous efforts have been made heretofore to produce a bath tub by joining sectional blanks. The tubs and methods for their manufacture which have been proposed, however, as far as I am aware, have all been objectionable in that they involve excessive amounts of scrap, or else require such a large amount of welding that they cannot be economically manufactured. I have invented a tub and a method of manufacture which overcomes these objections to the previous practice and makes it possible to form the necessary blanks economically from the standpoint of the amount of scrap produced. The tub of my invention is a two piece article and, therefore, requires but a single welded seam to assemble the finished tub. For certain types of tubs, a second welding operation is necessary to provide an apron.

In accordance with my invention, I form a tub by welding together suitably shaped sheet metal portions constituting the drain end and the bell end of the tub. Tubs of the conventional or open design are thus composed of two pieces only and require a single welding operation. Recessed or built-in tubs having a side apron require another welding operation to join the apron to the connected drain and bell ends.

The method of my invention will be better understood by referring to the accompanying drawings illustrating the successive steps in the manufacture of the tub of my invention.

In the drawings:

Figures 1A, 1B and 1C represent, respectively, the stock sheets from which the bell end, drain end and apron of the tub are formed;

Figures 2A, 2B and 2C represent the bell end, drain end and apron, respectively, after the first forming operation;

Figures 3A and 3B are central, longitudinal, sectional views;

Figure 4 is a sectional view along the line IV—IV of Figure 2C;

Figures 5A and 5B show the formed bell end and drain end blanks after trimming and punching;

Figure 6 is a plan view of a tub made by welding the bell end and drain end together;

Figure 7 shows the tub after the chipping and grinding of the welded seam;

Figure 8 shows the tub after one side thereof has been trimmed;

Figure 9 is a sectional view illustrating the welding of the apron to the tub;

Figure 10 shows the welded apron after the chipping and grinding of the seam;

Figure 11 is a sectional view showing the tub after the final trimming and bending operation;

Figure 12 is a plan view of the tub shown in Figure 11;

Figure 13 is an end view of the tub after the attachment of braces connecting the apron and rim portions;

Figure 14 is a plan view of the conventional or open type of tub formed from the blank of Figure 7; and Figure 15 is a sectional view through this type of tub to an enlarged scale.

Referring now in detail to the drawings, a metal sheet 10 of suitable gauge and size is subjected to a press forming operation to produce a bell end 11 for a tub as shown in Figures 2A and 3A. Another piece of stock 12 is similarly shaped to form the drain end 13. Each of the tub ends may be produced by a single drawing operation on the stock sheets. Similarly, an apron sheet 14 is drawn to form a recessed panel apron 15.

The bell and drain end blanks, after being formed, are subjected to an initial trimming operation by which they are cut off squarely along the lines 16 and 17. The appearance of the trimmed blanks is shown in Figures 5A and 5B. The trimming of the drain end blank 13 along the line 17 is accompanied by the punching of a drain hole 18. The blanks are now ready for welding.

Figure 6 illustrates the tub formed by welding the blanks 11 and 13 together. I prefer to join the blanks by electric welding with the formation of a seam or bead 19. This bead may be removed by chipping and grinding and the appearance of the unitary tub after these operations have been completed, is shown in Figure 7.

When the welded seam has been suitably smoothed down, the blank is ready to be sheared along the line 20, as shown in Figure 7, for the attachment of the apron blank 15. Figure 8 shows the appearance of the tub, which will now be referred to by the number 21, after one side edge of the blank has been sheared off.

The next operation is the welding of the apron blank 15 to the sheared edge 22 of the tub 21. This operation is also preferably effected electrically, the bead or seam being shown at 23 in Figure 9. Figure 10 shows the appearance of the tube 21 after the burr or bead has been removed from the seam joining the apron 15 and the side edge of the tub.

With the article in the condition shown in Figure 10, it is subjected to a combined trimming and bending operation. The rim portion 24 of the tub is sheared along lines 25, 26 and 27. The rear corners, furthermore, are notched as at 28. In the same operation, the rear and end edges of the rim 24 are bent upward to form a continuous flange 29 around the three sides of the rim. The apron 15 is also bent downwardly at this time to the position shown in Figure 11. Figure 12 shows the tub in plan after the completion of the foregoing operations.

The final step, as shown in Figure 13, is the attachment of braces 30 to the ends of the tub extending between the bottom edge of the apron 15 and the rear edge of the rim 24.

If it is desired to make a tub of the conventional open type instead of a recessed tub as shown in Figures 12 and 13, the blank of Figure 7 may be trimmed and bent as shown in Figures 14 and 15. This operation produces an open tub 31 having a roll edge 32. Legs 33 may be attached to the bottom of the tub in any convenient manner, or the tub may be seated in a continuous supporting ring or yoke.

It will be apparent that the tub and method of manufacture thereof disclosed herein are characterized by numerous advantages over articles of this kind as known previously and the methods of manufacture now in use. In the first place, the number of pieces is reduced to a minimum. The operations successively performed, furthermore, are simple in character and can readily be carried out with dies and presses that do not present any difficult problems in manufacture or operation.

The outstanding advantage of my invention is that the length of the bell end may be varied so as to provide a wide range of total lengths. The drain end is the same for all tubs and by merely changing the length of the bell end, it is possible to provide a tub of almost any desired total length. The advantages of sheet metal tubs over cast tubs generally, are already well known and need no enlargement here. The tub of my invention can readily be enameled by known processes and constitutes a very desirable product when finally completed. The percentage of the tubs rejected on inspection is much smaller than has heretofore been possible. In fact, this element alone has been largely responsible for the lack of success in the sectional sheet metal tub field heretofore. The success of my invention is attributable in part to the fact that I employ sheet metal of 12 or 14 gauge, which appears to lend itself most readily to electric flash welding and the formation of a seam which is practically homogeneous with the virgin metal, so that annealing complications are avoided. The amount of scrap resulting from the manufacture of tubs according to my method is quite small, as may readily be observed in the drawings, particularly Figures 2A, 2B, 7 and 8, showing the portions which are trimmed away.

Although I have disclosed herein but one preferred embodiment of the invention and a possible modification thereof, it will be understood that changes in the specific article and the method of manufacture may be made without departing from the spirit of the invention or the scope of the appended claims.

I claim:

1. In a method of making a tub, the steps including drawing the bell end from one piece of stock and the drain end from another, welding together said two ends only to form a complete tub, welding to one edge of the tub so formed a metal sheet adapted to form an apron, while supporting the sheet substantially in the plane defined by the rim of the tub, and bending said apron so as to position it in proper operative relation to the tub.

2. In a method of making tubs, the steps including drawing only two sheets into blanks adapted to form the drain end and bell end of a tub respectively, leaving flat flanges on said blanks, welding the blanks together end to end, trimming said flanges, and bending up the edge thereof.

3. In a method of making tubs, the steps including drawing single sheets into blanks adapted to form the complete drain end and bell end, respectively, of a tub, leaving the side and end edges of the blanks substantially flat, trimming the edges of the blanks which are adapted to abut in the finished tub, welding said last-mentioned edges together, smoothing the welded seam, trimming the rim of the tub made by welding the two blanks, bending up at least one of the rim edges, and leaving another edge substantially in its original plane.

CLARENCE JAMES RODMAN.